United States Patent

[11] 3,587,076

| | | |
|---|---|---|
| [72] | Inventor | James R. Grover<br>1932 C St. N.E., Miami, Okla. 74354 |
| [21] | Appl. No. | 727,854 |
| [22] | Filed | May 9, 1968 |
| [45] | Patented | June 22, 1971 |

[54] SYSTEM FOR REMOTELY INDICATING SELECTABLY TWO PHENOMENA
4 Claims, 1 Drawing Fig.

[52] U.S. Cl. ................................................. 340/182, 340/177, 340/176
[51] Int. Cl. ..................................................... G08c 19/04
[50] Field of Search .......................................... 340/188.5, 188, 203, 176, 210, 193.2, 150, 193.1, 151, 177

[56] References Cited
UNITED STATES PATENTS

| 2,232,288 | 2/1941 | Vehling | 340/203 |
| 2,597,088 | 5/1952 | Dutilh | 340/177 |

Primary Examiner—Thomas B. Habecker
Attorney—Head and Johnson

ABSTRACT: This invention relates to a system for indicating selectably two phenomena associated with a remote electrical device. More particularly, the invention is a system for indicating selectably two phenomena associated with an electrical device remote from a control point in which two conductive elements extend from the control point to the electrical device. The system includes a control assembly at the control point and a measuring assembly at the electrical device, the control assembly including a DC voltage source, a DC current measuring device, a double-pole, double-throw switch, the switch contact being arranged so that in one switch position DC voltage urges current flow in one direction through the conductive elements and in the other position the current is urged to flow in the opposite direction through the conductive elements, the measurement assembly including a first and second sensing element each in series with diodes, the sensing elements and diode members being connected in parallel with the diodes in opposed current conductivity relationships and the paralleled diodes and sensing elements being connected between the two conductive members so that in one position of said switch the voltage source imposes a direct current potential through said current measuring device and one of said diodes so that the resistance of one of the sensing elements is reflected by the current measuring device and in the switch position voltage is impressed so that current flows only through the second sensing element which resistance is reflected on the reading of the current measuring device.

PATENTED JUN22 1971 3,587,076
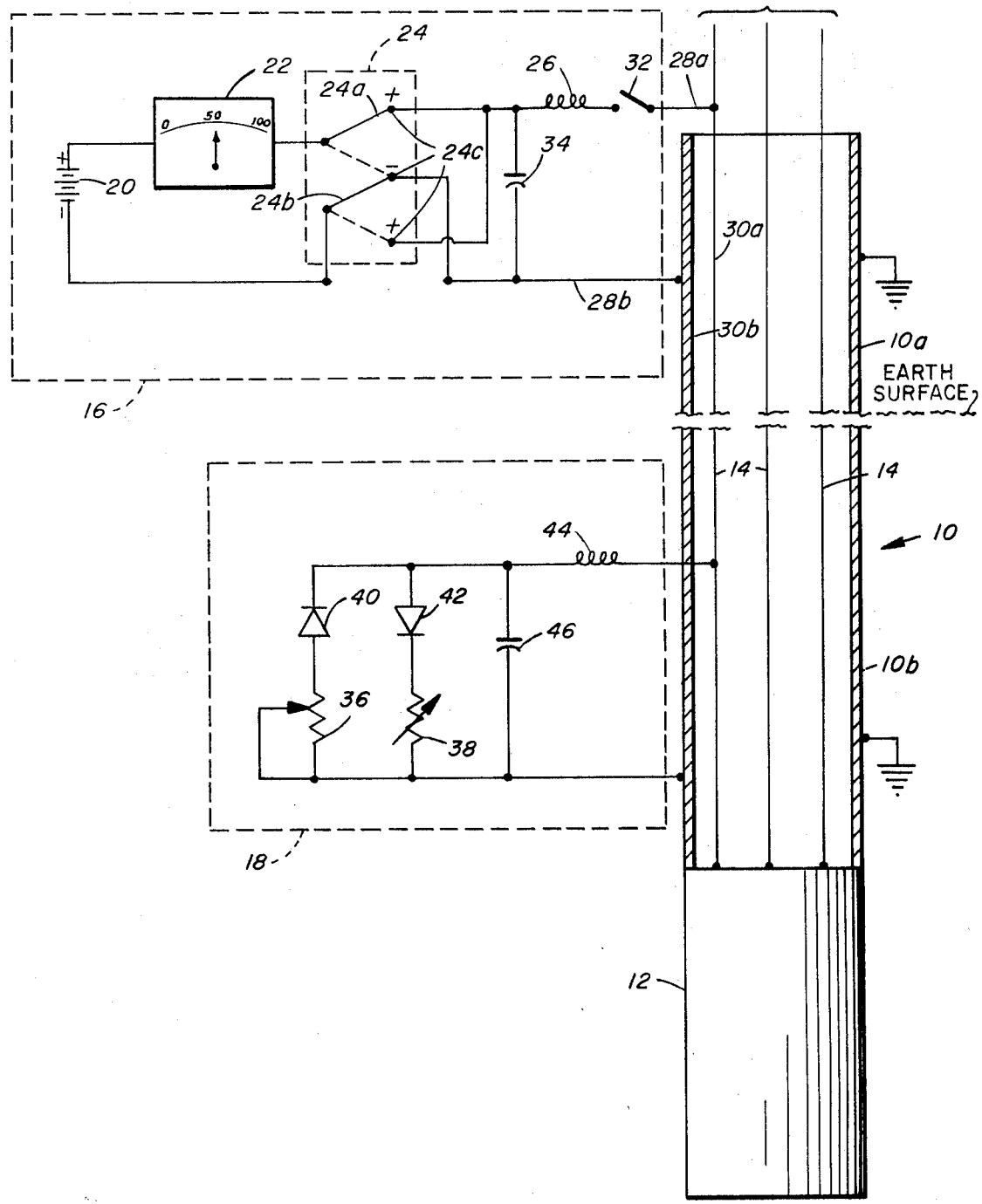
INVENTOR.
JAMES R. GROVER
BY Head & Johnson
ATTORNEYS

SYSTEM FOR REMOTELY INDICATING SELECTABLY TWO PHENOMENA

CROSS-REFERENCE

This invention is not related to any United States or foreign application.

SUMMARY OF THE INVENTION

This invention provides a means of obtaining two measurements using a simple DC current flow over two conductors in an arrangement wherein one or both of the conductors may be utilized for the transmission of alternating current energy. While the invention may be applied to a variety of applications, it is particularly applicable and will therefore be described as it relates to the use of the invention with an electrical bottom hole pump. Electric pumps, usually centrifugal in form, are frequently used to pump oil or water from wells. In oil industry applications, such centrifugal pumps are frequently located at very deep depths and are therefore expensive to install and remove since pumps are typically attached to the lower end of strings of tubing or casing which must be removed and installed one joint at a time.

It is frequently highly desirable for the user of a bottom hole pump to know the temperature at which the pump is operating as well as other information such as the pressure of the fluid being pumped at the pump level or the pressure of the fluid in the underground structure from which fluid is being extracted.

Obviously, sensing elements placed at the pump can be utilized to indicate temperatures, pressures or any other measurable characteristic of the pump and such measurements may be conveyed to the surface of the earth by means of conductors. However, when the bottom hole pump is positioned at a great depth (and it is not unusual for bottom hole pumps in the oil industry to be positioned thousands of feet below the earth's surface) the running of the extra conductors for measurements purposes is expensive and time consuming.

This invention provides a means of displaying readings on a measuring device at the earth's surface of two separate functions at a pump motor beneath the earth's surface wherein no additional cables or current carrying conductors are required. More particularly, an object of the invention is to provide a means of utilizing two current carrying conductors or one current carrying conductor and the tubing or casing string as a conductive element, for providing two selectable readings of phenomena measured at a bottom hole pump.

DESCRIPTION OF THE VIEW

The view shows a length of casing in cross section with a bottom hole pump at the lower end thereof as positioned in an earth borehole, with a schematic diagram of a control assembly positioned at the earth's surface and a measurement assembly positioned with the pump.

DETAILED DESCRIPTION

Referring to the drawing, a length of casing is indicated by the numeral 10, with the portion of the casing extending to or above the earth's surface indicated by 10a and the portion extending below the earth's surface and to a pump being indicated by 10b. The casing 10 may be in the form of a tubing positioned within a casing or the casing itself positioned in a borehole in the earth, the borehole not being shown. At the lower end of casing 10 is an electrical driven pump 12 which is shown only in outline and as such is well known in the art. Basically, the pump 12 withdraws fluid from an underground formation and pumps it upwardly in the interior of casing 10 to the earth's surface. Typically the pump 12 is energized by electrical energy supplied over conductors 14 which extend from the pump to the earth's surface and to a transformer or other source of alternating current electrical energy. If the pump 12 has a three-phase motor there may be three conductors 14 whereas if it is a single phase motor there may be only two conductors 14. Most of the installations of larger capacity bottom hole pumps are designed for use of three-phase electrical energy. In the usual application the conductors 14 are in the form of a single multiconductor cable and extend on the outside of the casing 10 so as not to interfere with the free flow of fluid up to the casing and because installation of such conductors within the casing would be substantially impossible, the conductors being shown within the casing in the drawing only for illustrative purposes.

The casing 10, motor 12, and conductors 14 are all well-known items in the petroleum industry. This invention provides a means at the earth's surface of measuring phenomena at the pump 12, such as the temperature at which the pump 12 is operating, the pressure of the fluid within the casing 10 at the pump, the pressure of the formation in which the pump is positioned, the temperature of the fluid at the intake to the pump, etc.

Generally speaking the invention consists of two portions, that is, a control assembly 16 which is located at the earth's surface and a measurement assembly 18 which is attached to or positioned within the pump 12.

The control assembly includes a DC voltage source 20 and a DC current measuring device 22 in series with the voltage source. A two-pole, double-throw switch 24 is provided including a pole 24a and a pole 24b with pole 24a in series with the current measuring device 22. In addition, a reactance means 26, which has a high reactance to AC current flow and a low resistance to DC current flow, is connected in series with switch 24. Conductors 28a and 28b connect the switch 24 with two conductive elements 30a and 30b which extend from the control assembly 16 to the measurements assembly 18. In the illustrated arrangement one of the conductors 14 is utilized for one conductive element 30a and the casing 10 is utilized for the other conductive element 30b although it can be seen that if desired, both conductive elements could consist of conductors 14. In series with conductor 28a is a switch 32. Extending between reactance element 26 and conductor 28b is a capacitor 34. The function of the reactance element 26 is to block AC current flow from current measuring device 22. The capacitor 34 assists in smoothing out any AC component of current passing through reactance 26.

Referring to measurement assembly 18, a first sensing element 36 and a second sensing element 38 is provided. In series with sensing element 36 is a diode 40 and likewise in series with sensing element 38 is diode 42. The pairs of sensing elements 36 and 38 and diodes 40 and 42 are in parallel with the diodes 40 and 42 being aligned in opposite current conductive relationships. In series with the paralleled sensing elements and diodes is a reactance element 44 which has a high reactance to AC current flow and a low resistance to DC current flow for the purposes previously described with reference to reactance element 26, that is, such element substantially blocks all AC component from the sensing elements. In addition, in parallel with the sensing elements and diodes is a capacitor 46 which serves to further filter any AC component which might be impressed upon the sensing elements.

OPERATION

Sensing elements 36 and 38 may be in the form of thermistors, variable resistors, and so forth. For instance, in the illustrated arrangement sensing element 36 may be a variable resistance actuated by a pressure sensitive device so that the resistance is varied in response to the fluid pressure at the pump 12. Sensing element 38 may be a thermistor whose resistance varies as the temperature of the pump varies. With switch 24 in the upward position as shown and switch 32 closed, DC voltage source 20 applies a positive voltage across each of the diodes 40 and 42 and sensing elements 36 and 38. Since diode 40 would block such positive current flow no current would flow through the sensing element 36 and therefore its resistance would be of no concern. However, the orientation of diode 42 is such that current flows therethrough and through sensing element 38 so that the total current flow through current measuring device 22 is predicated upon the resistance of sensing element 38. Thus, the reading indicated on current sensing element 22 in an indication of the resistance of sensing element 38 and by proper calibration such resistance measurement may be utilized to indicate a phenomena such as temperature.

With switch 24 in the downward position, shown in dotted view on the drawing, the voltage applied across the pair of diode and sensing elements in the measurement assembly 18 is reversed so that now current flow is blocked through diode 42 and sensing element 38 but diode 40 permits current flow through sensing element 36. The resistance of element 36 is then reflected by current sensing element 22 and the calibration thereof may be such as to indicate the pressure at the pump 12.

Thus, it can be seen that by the arrangement of this invention two separate measurements may be selectably indicated on a current sensing device 22 utilizing the same pair of conductive elements 30a and 30b and in an arrangement wherein one or more of the conductive elements can be otherwise utilized to transmit AC electrical energy.

As has been previously stated, the principles of the invention may be applied to making two selectable measurements between any two spaced points over conductors utilized to transmit electrical energy from one point to another. The application of the invention to making two separate measurements of phenomena at an electric bottom hole pump is merely for purposes of exemplification of one practical embodiment of the invention.

It is understood that the invention is not limited by the abstract herein, nor the summary, nor to the specific embodiment which has been illustrated for purposes of exemplifying the invention, but the invention is to be limited only by the scope of the attached claim or claims, including the full range of equivalency to which each element therein is entitled.

What I claim is:

1. A system for selectably indicating at a control location two phenomena associated with a device wherein the device is separated from the control location and in which two conductive elements extend from the control location to the apparatus, comprising:
   a. a control assembly at said control location, said control assembly including:
   1. a two-pole DC voltage source;
   2. a DC current measuring device in series with one pole of said DC voltage source;
   3. a double-pole, double-throw switch having one pole in series with said current measuring device and the other pole in series with the other pole of said DC voltage source, said switch having contact points engaged by said switch poles;
   4. a reactance means having a high reactance to AC current flow and a low resistance to DC current flow, said reactance means being connected between one of said conductive elements and said switch contact points and a conductor extending from said switch contact points to the other of said conductive elements, said switch contact points being arranged so that in one switch position said DC voltage source induces DC current flow in one direction through said conductive elements and in another switch position DC current flow is induced in another direction through said conductive elements; and
   b. a measurement assembly at said electrical device including
   1 a first sensing element providing a varying resistance in response to a first phenomenon;
   2 a first diode in series with said first sensing element;
   3 a second sensing element providing a varying resistance in response to a second phenomenon;
   4 a second diode in series with said second sensing element, said sensing elements and diode members being connected in parallel with said diodes being in opposed current conductive relationship, said paralleled sensing members and diodes being connected between said conductive elements whereby when said switch is in one position DC current flows through said current measuring device and one of said sensing elements according to the polarity of the said diode in series therewith to register on said current measuring device an indication of the resistance of said one of said sensing elements and when said switch is in the other position current flows through the other of said sensing elements to register on said current measuring device an indication of the resistance of the other of said sensing elements.

2. A means for indicating selectably two phenomena associated with an electrical device according to claim 1 including in said control assembly, a capacitor in parallel with said seriesed current measuring device and said DC voltage source to filter, in conjunction with said reactance means, any AC component which might otherwise be impressed on said current measuring device.

3. A means for indicating selectably two phenomena associated with an electrical device according to claim 1 including, in said measurement assembly, a reactance in series with said paralleled diode and sensing elements.

4. A means for indicating selectably two phenomena associated with an electrical device according to claim 3 including, in said measurement assembly, a capacitor in parallel with said paralleled diode and sensing elements.